United States Patent
Li et al.

(10) Patent No.: US 11,770,810 B2
(45) Date of Patent: Sep. 26, 2023

(54) SERVICE DATA TRANSMISSION METHOD, FIRST COMMUNICATIONS NODE, AND BASE STATION

(71) Applicant: Huawei Technologies Co., Ltd., Shenzhen (CN)

(72) Inventors: Mingchao Li, Beijing (CN); Zhenzhen Cao, Beijing (CN); Hang Liu, Beijing (CN); Xiao Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/520,616

(22) Filed: Jul. 24, 2019

(65) Prior Publication Data

US 2019/0349936 A1 Nov. 14, 2019

Related U.S. Application Data

(63) Continuation of application No. PCT/CN2017/072685, filed on Jan. 25, 2017.

(51) Int. Cl.
*H04W 72/0453* (2023.01)
*H04W 76/11* (2018.01)
*H04W 4/20* (2018.01)
*H04W 4/40* (2018.01)
*H04W 88/08* (2009.01)

(52) U.S. Cl.
CPC ......... *H04W 72/0453* (2013.01); *H04W 4/20* (2013.01); *H04W 76/11* (2018.02); *H04W 4/40* (2018.02); *H04W 88/08* (2013.01)

(58) Field of Classification Search
None
See application file for complete search history.

(56) References Cited

U.S. PATENT DOCUMENTS

2013/0115965 A1* 5/2013 Xu ............... H04W 72/0453
                                                    455/450
2015/0195827 A1* 7/2015 Feng .............. H04W 4/40
                                                    455/552.1

(Continued)

FOREIGN PATENT DOCUMENTS

CN         1396744 A      2/2003
CN       101631384 A      1/2010

(Continued)

OTHER PUBLICATIONS

LG Electronics, "TP on the operating scenarios for V2X Service", 3GPP TSG-RAN WG4 #80BIS, R4-168237, Ljubljana, Slovenia, Oct. 10-14, 2016, 6 pages.

(Continued)

*Primary Examiner* — Srinivasa R Reddivalam
(74) *Attorney, Agent, or Firm* — Slater Matsil, LLP

(57) ABSTRACT

A service data transmission method, a first communications node and a base station are disclosed. In an embodiment a method includes obtaining, by a first communications node, transmission carrier frequency configuration information of a first service type, wherein the transmission carrier frequency configuration information of the first service type includes at least one first transmission carrier frequency identifier, obtaining, by the first communications node, first service data and a first identifier, wherein the first identifier indicates that the first service data belong to the first service type, determining, by the first communications node based on the first identifier and the first transmission carrier frequency identifier, a first transmission carrier frequency corresponding to the first transmission carrier frequency identifier and transmitting, by the first communications node, the first service data on the first transmission carrier frequency.

20 Claims, 4 Drawing Sheets

(56) References Cited

U.S. PATENT DOCUMENTS

| | | | | |
|---|---|---|---|---|
| 2015/0201447 A1* | 7/2015 | Li | ................... | H04W 28/0263 455/450 |
| 2016/0134760 A1* | 5/2016 | Castro Castro | ..... | H04L 12/1478 455/406 |
| 2018/0132208 A1* | 5/2018 | Pan | ................... | H04W 72/0406 |
| 2018/0199181 A1* | 7/2018 | Jung | ................... | H04W 72/02 |
| 2018/0242234 A1* | 8/2018 | Semaan | ................ | H04W 48/18 |
| 2018/0338347 A1* | 11/2018 | Lee | ................... | H04W 88/182 |
| 2019/0274065 A1* | 9/2019 | Zhao | ................... | H04W 24/10 |
| 2019/0342762 A1* | 11/2019 | Nilsson | ................. | H04W 16/14 |
| 2020/0305167 A1* | 9/2020 | Freda | ................ | H04W 72/0493 |

FOREIGN PATENT DOCUMENTS

| | | |
|---|---|---|
| CN | 105979598 A | 9/2016 |
| JP | 2016096475 A | 5/2016 |
| JP | 2018503320 A | 2/2018 |
| KR | 100678309 B1 | 2/2007 |
| WO | 2014012244 A1 | 1/2014 |
| WO | 2016022009 A1 | 2/2016 |
| WO | 2016116145 A1 | 7/2016 |

OTHER PUBLICATIONS

Ericsson, "Coexistence approaches between different technologies for ITS services", 3GPP Tsg Ran WG1 Meeting #84BIS, R1-162814, Busan, Apr. 11-15, 2016, 4 pages.

Huawei, et al., "Support Multi-carrier Multi-PLMN Operations for PC5 Based V2X", 3GPP TSG RAN WG2 Meeting #95, R2-164921, Gothenburg, Sweden, Aug. 22-26, 2016, total 4 pages.

Huawei, et al., "On carrier selection for multi-carrier operation", 3GPP TSG RAN WG2 Meeting #97, R2-1701367, Athens, Greece, Feb. 13-17, 2017, total 4 pages.

* cited by examiner

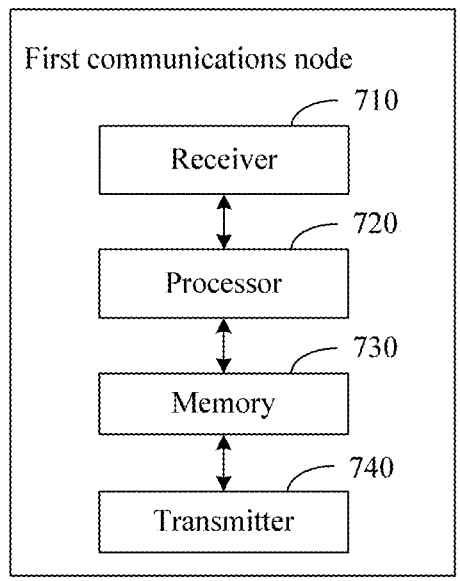

FIG. 7

A base station sends transmission carrier frequency configuration information of a first service type to a first communications node, where the transmission carrier frequency configuration information of the first service type includes at least one first transmission carrier frequency identifier, and the first transmission carrier frequency identifier is used by the first communications node to determine, based on first service data and a first identifier that are obtained by the first communications node and the first transmission carrier frequency identifier, a first transmission carrier frequency used to transmit the first service data ⟵ 810

FIG. 8

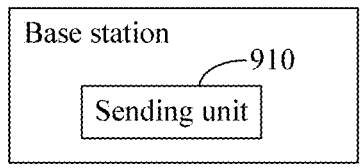

FIG. 9

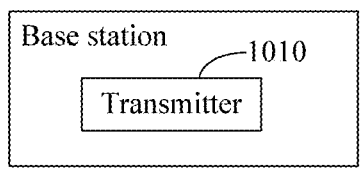

FIG. 10

SERVICE DATA TRANSMISSION METHOD, FIRST COMMUNICATIONS NODE, AND BASE STATION

CROSS-REFERENCE TO RELATED APPLICATIONS

This application is a continuation of International Application No. PCT/CN2017/072685, filed on Jan. 25, 2017, the disclosure of which is hereby incorporated by reference in its entirety.

TECHNICAL FIELD

The present invention relates to the field of communications technologies, and in particular, to a service data transmission method, a first communications node, and a base station.

BACKGROUND

The internet of vehicles is a network for vehicle-to-another-device (V2X) communication. X represents any device, for example, a vehicle, infrastructure on a road side, a pedestrian, or a network. An intelligent transportation system (ITS) includes internet of vehicles technologies such as vehicle-to-vehicle communications and vehicle-to-infrastructure communication.

Currently, in LTE, two V2X service transmission methods are included. A first method is a communication method through forwarding by a base station. In the communication method, a V2X service is transmitted by one terminal to the base station, and then forwarded by the base station to another terminal. A second method is a communication method through direct connection between terminals. In the communication method, a V2X service is directly transmitted between the two terminals, not requiring forwarding by a base station.

In a service classification manner, V2X services are classified into a safety service and a non-safety service based on an attribute. The safety service may include a service related to personal safety or traffic safety. The non-safety service may include a service related to entertainment or map downloading. According to a spectrum usage rule of some regions, the safety service and the non-safety service must be transmitted on respective specified carrier frequencies. However, in the prior art, according to the communication method with direct connection between terminals, an LTE communications network configures/preconfigures a plurality of carrier frequencies for a terminal to transmit a V2X service, and the V2X service may be transmitted on any configured/preconfigured transmission carrier frequency. According to the prior art, based on the configuration/preconfiguration of the LTE communications network, the terminal transmits a safety service on a non-safety service carrier frequency, or transmits a non-safety service on a safety service carrier frequency. Therefore, a current transmission manner of the V2X service does not meet the spectrum usage rule, and consequently, V2X service transmission does not conform to the spectrum usage rule.

SUMMARY

Embodiments of the present invention provide a method for transmitting first service data, a first communications node, and a base station, to resolve a problem in the prior art that a V2X service does not meet a spectrum usage rule due to transmission of the V2X service on a plurality of configured or preconfigured transmission carrier frequencies.

According to a first aspect, an embodiment of the present invention provides a service data transmission method. The method includes: obtaining, by a first communications node, transmission carrier frequency configuration information of a first service type, and obtaining first service data and a first identifier, where the transmission carrier frequency configuration information of the first service type includes at least one first transmission carrier frequency identifier, and the first identifier is used to indicate that the first service data belongs to the first service type; further, determining, based on the first transmission carrier frequency identifier and the first identifier, a first transmission carrier frequency used to transmit the first service data; and transmitting, by the first communications node, the first service data on the first transmission carrier frequency.

In this embodiment of this application, through the foregoing example, in the service data transmission method provided in this embodiment of the present invention, the transmission carrier frequency configuration information of the first service type includes the at least one first transmission carrier frequency identifier, so that the first communications node can determine, by using the obtained first identifier and the first transmission carrier frequency identifier, the first transmission carrier frequency used to transmit the first service data. In an optional embodiment, the obtaining, by the first communications node, first service data and a first identifier includes: obtaining, by the first communications node, the first service data and the first identifier that are sent by an upper layer.

In a possible design, when it is determined, based on the first identifier, that a service type of the first service data is the first service type, the determining, by the first communications node based on the first identifier and the first transmission carrier frequency identifier, a first transmission carrier frequency used to transmit the first service data includes: determining, by the first communications node based on the first transmission carrier frequency identifier, the first transmission carrier frequency used to transmit the first service data.

In a possible design, the transmission carrier frequency configuration information of the first service type further includes at least one second identifier corresponding to the at least one first transmission carrier frequency identifier; and the first communications node determines, based on the first identifier and the first transmission carrier frequency identifier, the first transmission carrier frequency used to transmit the first service data.

In a possible design, when the first identifier is the second identifier, the first communications node determines, based on the first transmission carrier frequency identifier corresponding to the second identifier, the first transmission carrier frequency used to transmit the first service data.

In a possible design, the transmission carrier frequency configuration information of the first service type further includes a threshold; and the first communications node determines, based on the first identifier and the first transmission carrier frequency identifier, the first transmission carrier frequency used to transmit the first service data.

In a possible design, when the first identifier is greater than or equal to the threshold, the first communications node determines, based on the first transmission carrier frequency identifier, the first transmission carrier frequency used to transmit the first service data; or when the first identifier is less than the threshold, the first communications node determines, based on the first transmission carrier frequency identifier corresponding to the threshold, the first transmission carrier frequency used to transmit the first service data.

In a possible design, the first identifier includes at least one of a service type identifier, a destination address identifier, a source address identifier, a priority identifier, a carrier frequency indication identifier, and/or a channel indication identifier.

In a possible design, the first identifier is indicated by using a fixed indicator field of a data structure to which at least one of the service type identifier, the destination address identifier, the source address identifier, the priority identifier, the carrier frequency indication identifier, and/or the channel indication identifier belongs.

In a possible design, when the transmission carrier frequency configuration information of the first service type includes at least two first transmission carrier frequency identifiers, the first communications node determines, based on the first identifier and the first transmission carrier frequency identifier, the first transmission carrier frequency used to transmit the first service data.

In a possible design, the first communications node randomly selects a transmission carrier frequency corresponding to one of the at least two first transmission carrier frequency identifiers to transmit the first service data; or the first communications node selects, based on resource load statuses of transmission carrier frequencies corresponding to the at least two first transmission carrier frequency identifiers, a transmission carrier frequency corresponding to one of the at least two first transmission carrier frequency identifiers to transmit the service.

In a possible design, before the determining, by the first communications node based on the first identifier and the first transmission carrier frequency identifier, a first transmission carrier frequency used to transmit the first service data, the method further includes: receiving, by the first communications node from a base station, transmission carrier frequency list information that is sent by the base station by using system broadcast information or radio resource control protocol RRC dedicated signaling, where the transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

In a possible design, the obtaining, by a first communications node, transmission carrier frequency configuration information of a first service type includes: obtaining, by the first communications node, the transmission carrier frequency configuration information of the first service type by receiving system broadcast information or radio resource control protocol RRC dedicated control signaling of the base station or control information sent by a core network control node; or obtaining, by the first communications node, the transmission carrier frequency configuration information of the first service type by using preconfigured or prestored information; or obtaining the transmission carrier frequency configuration information of the first service type by receiving configuration information of the upper layer.

In a possible design, the first service data of the first service type is a safety-related service or a non-safety-related service.

In a possible design, the transmitting, by the first communications node, the first service data on the first transmission carrier frequency further includes: when the service type, indicated by the first identifier, of the first service data is not the first service type, skipping, by the first communications node, transmitting the first service data on the first transmission carrier frequency.

According to a second aspect, an embodiment of the present invention provides a service data transmission method. The method includes: sending transmission carrier frequency configuration information of a first service type to a first communications node, where the transmission carrier frequency configuration information of the first service type includes at least one first transmission carrier frequency identifier, the first transmission carrier frequency identifier is used by the first communications node to determine, based on first service data and a first identifier that are obtained by the first communications node and the first transmission carrier frequency identifier, a first transmission carrier frequency used to transmit the first service data, and the first identifier is used to indicate that the first service data belongs to the first service type.

In a possible design, through the foregoing example, in the service data transmission method provided in this embodiment of the present invention, the transmission carrier frequency configuration information of the first service type is sent, and the transmission carrier frequency configuration information of the first service type includes the at least one first transmission carrier frequency identifier, so that the first communications node can determine, by using the obtained first identifier and the first transmission carrier frequency identifier, the first transmission carrier frequency used to transmit the first service data.

In a possible design, through the foregoing embodiment, in the service data transmission method provided in this embodiment of the present invention, the transmission carrier frequency configuration information of the first service type includes the at least one first transmission carrier frequency identifier, so that the first communications node can determine, by using the obtained first identifier and a second identifier corresponding to the first transmission carrier frequency identifier, the first transmission carrier frequency used to transmit the first service data.

In a possible design, the transmission carrier frequency configuration information of the first service type further includes at least one second identifier corresponding to the at least one first transmission carrier frequency identifier, and the second identifier is used to indicate that a transmission carrier frequency corresponding to the first transmission carrier frequency identifier supports transmission of service data of the first service type.

In a possible design, the information further includes a threshold, and the threshold is used to instruct the first communications node to: when the first identifier is greater than or equal to the threshold, determine, based on the first transmission carrier frequency identifier corresponding to the threshold, the first transmission carrier frequency used to transmit the first service data.

In a possible design, the method further includes: sending transmission carrier frequency list information to the first communications node by using system broadcast information or RRC dedicated signaling, where the transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

According to a third aspect, an embodiment of the present invention provides a first communications node. The first communications node includes: an obtaining unit, configured to obtain transmission carrier frequency configuration information of a first service type, where the transmission carrier frequency configuration information of the first service type includes at least one first transmission carrier frequency identifier, and a transmission carrier frequency corresponding to the first transmission carrier frequency identifier is used to transmit service data of the first service type, where the obtaining unit is further configured to obtain first service data and a first identifier, where the first identifier is used to indicate that the first service data belongs to the first service type; a determining unit, configured to determine, based on the first identifier and the first transmission carrier frequency identifier, a first transmission carrier frequency used to transmit the first service data; and a data transmission unit, configured to transmit the first service data on the first transmission carrier frequency.

In this embodiment of this application, through the foregoing example, according to the first communications node provided in this embodiment of the present invention, the first communications node can obtain the transmission carrier frequency configuration information, which is preconfigured or prestored or is sent by a base station, of the first service type, where the transmission carrier frequency configuration information of the first service type includes at least one piece of first transmission carrier frequency identifier; and further determine, by using the first identifier used to indicate that the first service data belongs to the first service type, the first transmission carrier frequency used to transmit the first service data.

In a possible design, the second obtaining unit is configured to obtain the first service data and the first identifier that are sent by a protocol layer above an access stratum.

In a possible design, when determining, based on the first identifier, that the first service data belongs to a first service type, the determining unit is configured to determine, based on the first transmission carrier frequency identifier, the first transmission carrier frequency used to transmit the first service data.

In a possible design, the transmission carrier frequency configuration information of the first service type further includes at least one second identifier corresponding to the at least one first transmission carrier frequency identifier; and the determining unit is configured to: when the first identifier is the second identifier, determine, based on the first transmission carrier frequency identifier corresponding to the second identifier, the first transmission carrier frequency used to transmit the first service data.

In a possible design, the transmission carrier frequency configuration information of the first service type further includes a threshold; and when the first identifier is greater than or equal to the threshold, the determining unit is configured to determine, based on the first transmission carrier frequency identifier, the first transmission carrier frequency used to transmit the first service data; or when the first identifier is less than the threshold, the determining unit is configured to determine, based on the first transmission carrier frequency identifier corresponding to the threshold, the first transmission carrier frequency used to transmit the first service data.

In a possible design, the first identifier includes at least one of a service type identifier, a destination address identifier, a source address identifier, a priority identifier, a carrier frequency indication identifier, and a channel indication identifier.

In a possible design, the first identifier is indicated by using a fixed indicator field of a data structure to which at least one of the service type identifier, the destination address identifier, the source address identifier, the priority identifier, the carrier frequency indication identifier, and the channel indication identifier belongs.

In a possible design, when the transmission carrier frequency configuration information of the first service type includes at least two first transmission carrier frequency identifiers, the determining unit is configured to: randomly select a transmission carrier frequency corresponding to one of the at least two first transmission carrier frequency identifiers to transmit the first service data; or select, based on resource load statuses of transmission carrier frequencies corresponding to the at least two first transmission carrier frequency identifiers, a transmission carrier frequency corresponding to one of the at least two first transmission carrier frequency identifiers to transmit the service.

In a possible design, the first communications node further includes a receiving unit, and the receiving unit is configured to: receive, from a base station, transmission carrier frequency list information that is sent by the base station by using system broadcast information or radio resource control protocol RRC dedicated signaling, where the transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

In a possible design, the first obtaining unit is further configured to: obtain the transmission carrier frequency configuration information of the first service type by receiving system broadcast information or radio resource control protocol RRC dedicated control signaling of the base station or control information sent by a core network control node; or obtain the transmission carrier frequency configuration information of the first service type by using preconfigured or prestored information; or obtain the transmission carrier frequency configuration information of the first service type by receiving configuration information of the protocol layer above the access stratum.

In a possible design, the first service data is a safety-related service or a non-safety-related service.

In a possible design, when a service type, indicated by the first identifier, of the first service data is not the first service type, the data transmission unit does not transmit the first service data on the first transmission carrier frequency.

According to a fourth aspect, an embodiment of the present invention provides a base station. The base station includes: a sending unit, configured to send transmission carrier frequency configuration information of a first service type to a first communications node, where the transmission carrier frequency configuration information of the first service type includes at least one first transmission carrier frequency identifier, the first transmission carrier frequency identifier is used by the first communications node to determine, based on first service data and a first identifier that are obtained by the first communications node and the first transmission carrier frequency identifier, a first transmission carrier frequency used to transmit the first service data, and the first identifier is used to indicate that the first service data belongs to the first service type.

In this embodiment of this application, through the foregoing example, according to the base station provided in this embodiment of the present invention, the base station sends the transmission carrier frequency configuration information of the first service type, where the transmission carrier frequency configuration information of the first service type includes at least one piece of first transmission carrier frequency configuration information, and further determines, by using the first identifier used to indicate that the first service data belongs to the first service type, the first transmission carrier frequency used to transmit the first service data.

In a possible design, the transmission carrier frequency configuration information of the first service type further includes at least one second identifier corresponding to the at least one first transmission carrier frequency identifier, and the second identifier is used to indicate that a transmission carrier frequency corresponding to the first transmission carrier frequency identifier supports transmission of service data of the first service type.

In a possible design, the transmission carrier frequency configuration information of the first service type further includes a threshold, and the threshold is used to instruct the first communications node to: when the first identifier is greater than or equal to the threshold, determine, based on the first transmission carrier frequency identifier corresponding to the threshold, the first transmission carrier frequency used to transmit the first service data.

In a possible design, the sending unit is further configured to send transmission carrier frequency list information to the first communications node by using system broadcast information or RRC dedicated signaling, where the transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

According to a fifth aspect, an embodiment of this application provides a computer-readable storage medium, including an instruction. When the instruction runs on a computer, the computer performs the method in the first to fourth aspects and various possible designs.

Based on the service data transmission method, the first communications node, and the base station that are provided in the embodiments of the present invention, when the first communications node needs to transmit the first service data, the first communications node determines, based on the at least one first transmission carrier frequency identifier included in the transmission carrier frequency configuration information of the first service type and the first identifier, the first transmission carrier frequency used to transmit the first service data, where the first identifier is used to indicate that the first service data belongs to the first service type; and transmits the first service data on the first transmission carrier frequency. In this way, a spectrum usage rule is met.

BRIEF DESCRIPTION OF THE DRAWINGS

FIG. 7 is an architectural diagram of another first communications node according to an embodiment of the present invention;

FIG. 8 is a flowchart of a data transmission method according to an embodiment of the present invention;

FIG. 9 is an architectural diagram of a base station according to an embodiment of the present invention; and FIG. 10 is an architectural diagram of another base station according to an embodiment of the present invention.

DETAILED DESCRIPTION OF ILLUSTRATIVE EMBODIMENTS

In embodiments of the present invention, nouns "network" and "system" are often interchangeably used, but meanings of the nouns can be understood by a person skilled in the art. A base station in the embodiments of the present invention is an apparatus that is deployed in a radio access network to provide a wireless communication function for a first communications node. The base station has a radio resource management function, and communicates with the first communications node, or acts as a central controller to assist direct communication between first communications nodes.

A service data transmission method described in the embodiments of the present invention may be applied to data transmission between a plurality of communication parties, for example, data transmission between the first communications node and the base station, and data transmission between the first communications nodes. For example, the service data transmission method may be applied to an internet of vehicles system. In addition, during service data transmission in the system, a plurality of communication means may be used. For example, a long term evolution (LTE) technology is used, or another radio access technology is used. In addition, a subsequent evolved technology of LTE, such as 5G, may be used for transmission, and so on.

Figure 1:
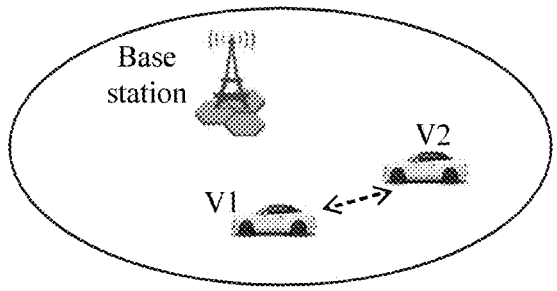
FIG. 1 is a schematic architectural diagram of a communications system according to an embodiment of the present invention.

FIG. 1 is a schematic architectural diagram of a communications system according to an embodiment of the present invention. The system includes: at least one first communications node and a base station. The at least one first communications node may establish a communication connection to the base station, or one of the at least one communications node establishes a communication connection to another communications node. Specifically, in this embodiment of the present invention, the first communications node may include various in-vehicle terminal devices, mobile terminal devices, or handheld terminal devices that have a wireless communication function or other processing devices connected to a wireless modem. In this embodiment of the present invention, the first communications node may include, but is not limited to, a vehicle, a handheld device, and a device that can communicate with a base station device or directly communicate with another first communications node.

The base station (BS) in this application is an apparatus that is deployed in a radio access network to provide a wireless communication function for a communications node. The base station may include a macro base station, a micro base station, a relay station, an access point, and the like in various forms. In systems using different radio access technologies, devices having a base station function may have different names. For example, in an LTE network, the device is referred to as an evolved NodeB (eNB or eNodeB for short); in a 3rd Generation 3G network, the device is referred to as a NodeB or the like; or in V2V communication, the device is referred to as a road side unit (RSU). For ease of description, in this application, the foregoing apparatuses that provide a wireless communications function for a communications node are collectively referred to as a base station or a BS.

The communications node in this application may include various handheld devices, in-vehicle devices, wearable devices, or computing devices that have a radio communication function or other processing devices connected to a wireless modem, and communications nodes in various forms, including a mobile station (MS), a terminal, terminal equipment (TE), user equipment (UE), and the like. For ease of description, in this application, the foregoing devices are collectively referred to as a communications node.

The first communications node first obtains transmission carrier frequency configuration information of a first service type. The first communications node can obtain at least the transmission carrier frequency configuration information, which is preconfigured/prestored and/or is sent at a protocol layer above an access stratum and/or by a base station and/or a core network, of the first service type. The transmission carrier frequency configuration information of the first service type includes at least one first transmission carrier frequency identifier. The first communications node obtains a first identifier and first service data. The first identifier is used to indicate that the first service data belongs to the first service type. The first communications node determines, based on the first identifier and the first transmission carrier frequency identifier, a first transmission carrier frequency used to transmit the first service data.

In the communications system provided in this embodiment of the present invention, the first communications node can obtain the transmission carrier frequency configuration information, which is preconfigured or prestored or is sent by the base station or the core network, of the first service type, where the transmission carrier frequency configuration information of the first service type includes at least one piece of first transmission carrier frequency configuration information; and further determine, by using the first identifier used to indicate that the first service data belongs to the first service type, the first transmission carrier frequency used to transmit the first service data.

Figure 2:
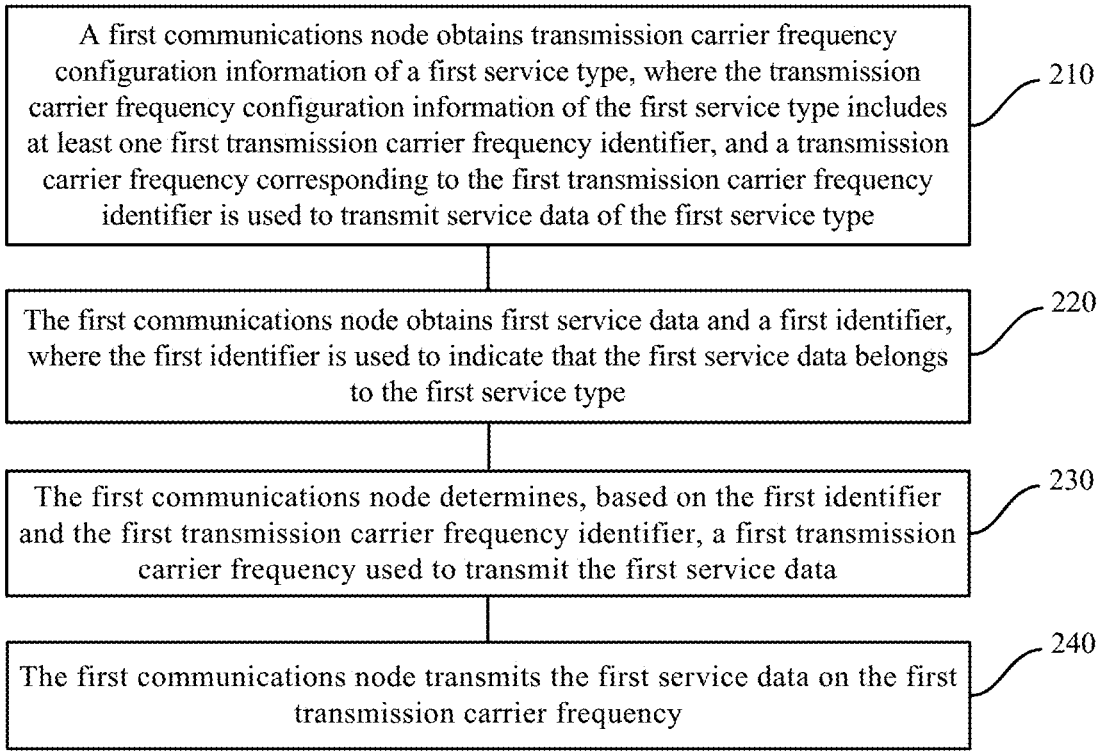
FIG. 2 is a flowchart of a service data transmission method according to an embodiment of the present invention.

A solution provided in an embodiment of the present invention is described below in detail with reference to FIG. 2. FIG. 2 is a flowchart of a service data transmission method according to an embodiment of the present invention. In this embodiment of the present invention, the method is performed by a first communications node. As shown in FIG. 2, this embodiment specifically includes the following steps.

Step 210: The first communications node obtains transmission carrier frequency configuration information of a first service type, where the transmission carrier frequency configuration information of the first service type includes at least one first transmission carrier frequency identifier, and a transmission carrier frequency corresponding to the first transmission carrier frequency identifier is used to transmit service data of the first service type. The transmission carrier frequency configuration information may be obtained in a plurality of manners, and only three manners are enumerated below.

Figure 3:
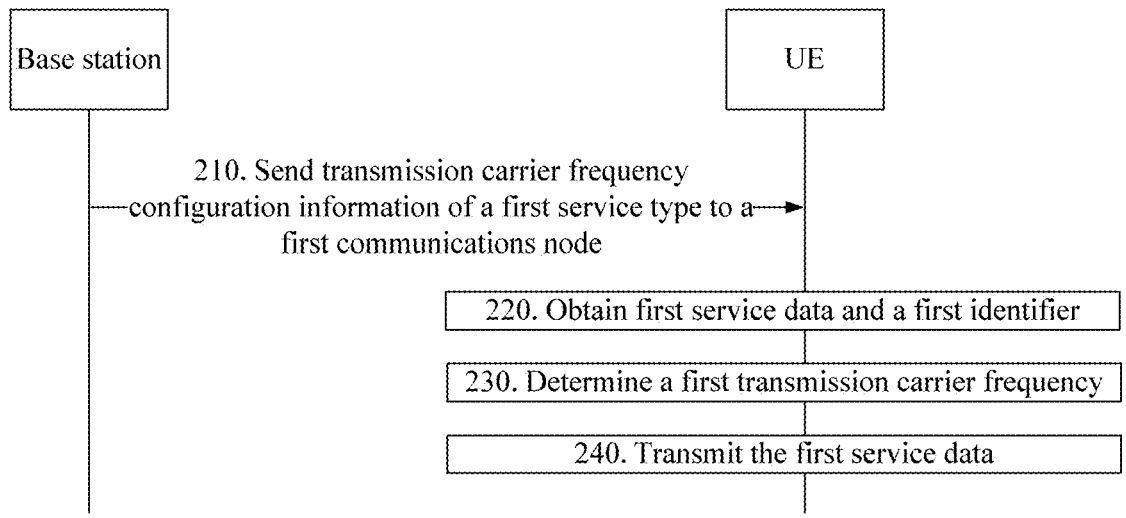
FIG. 3 is a flowchart of another data transmission method according to an embodiment of the present invention.

In an optional embodiment, the first communications node may obtain the transmission carrier frequency configuration information of the first service type by receiving system broadcast information or radio resource control (RRC) dedicated control signaling sent by a base station or control information sent by a core network control node, as shown in FIG. 3. After receiving the transmission carrier frequency configuration information of the first service type sent by the base station, the first communications node performs step 220, step 230, and step 240.

In an optional embodiment, the first communications node may obtain the transmission carrier frequency configuration information of the first service type from a memory of the first communications node. The transmission carrier frequency configuration information of the first service type stored in the first communications node may be information preconfigured by the first communications node, or may be transmission carrier frequency configuration information of the first service type obtained by the first communications node from a base station or a core network control node and stored by the first communications node.

In an optional embodiment, the first communications node may obtain the transmission carrier frequency configuration information of the first service type from configuration information of a protocol layer above an access stratum.

Specifically, the protocol layer above the access stratum may be the protocol layer above the access stratum, and may be in a protocol form such as a network transmission layer, an application layer, or a network adaptation layer, or may be a protocol layer above a physical protocol layer, a media access control protocol layer, a radio link transmission protocol layer, or a packet data convergence protocol layer. A specific implementation form is not limited herein. A specific implementation form is not limited herein.

The transmission carrier frequency configuration information of the first service type includes an identifier corresponding to a transmission carrier frequency, and the identifier indicates the transmission carrier frequency corresponding to the identifier and a service type of service data to be transmitted. For example, transmission configuration information of the first service type includes at least one first transmission carrier frequency identifier, and the first transmission carrier frequency identifier is used to indicate a transmission carrier frequency corresponding to a first transmission carrier frequency and indicate that a type of service data to be transmitted is the first service type.

Optionally, the first service type may be a service type obtained through classification based on a requirement. For example, a safety service and a non-safety service are obtained through classification based on a road safety requirement. Assuming that the first service type is a safety-related internet of vehicles service, the transmission carrier frequency configuration information of the first service type is configured based on a service type being the safety-related internet of vehicles service. The transmission carrier frequency configuration information of the first service type may include at least one first transmission carrier frequency identifier, and the first transmission carrier frequency identifier corresponds to a transmission carrier frequency for transmitting the safety-related internet of vehicles service. The foregoing description is also applicable to the first service type that is a non-safety service type, and the first service type may be a non-safety-related internet of vehicles service type.

Optionally, the first transmission carrier frequency identifier and the first transmission carrier frequency have a correspondence. For example, the first transmission carrier frequency identifier and the first transmission carrier frequency may be in a one-to-one or many-to-one correspondence. The first communications node transmits the service data of the first service type on the first transmission carrier frequency based on the correspondence between the first transmission carrier frequency identifier and the first transmission carrier frequency.

Optionally, the first transmission carrier frequency identifier may be a frequency indication or a frequency index identifier.

Step 220: The first communications node obtains first service data and a first identifier, where the first identifier is used to indicate that the first service data belongs to the first service type.

In an optional embodiment, when the first communications node receives a first service data that is delivered by the protocol layer above the access stratum to the access stratum, information used to indicate a service type of the first service data, namely, the first identifier, is also transmitted to the access stratum.

Specifically, the protocol layer above the access stratum may be, for example, in a protocol form such as a network transmission layer, an application layer, or a network adaptation layer, or may be a protocol layer above a physical protocol layer, a media access control protocol layer, a radio link transmission protocol layer, or a packet data convergence protocol layer. A specific implementation form is not limited herein.

In an optional embodiment, the first identifier may include at least one of a destination address identifier, a source address identifier, a service type identifier, a priority identifier, a carrier frequency indication identifier, and a channel indication identifier of the first service data.

In an optional embodiment, the first identifier may be the destination address identifier, the source address identifier, the service type identifier, the priority identifier, the carrier frequency indication identifier, or the channel indication identifier of the first service data.

For example, the first identifier is the service type identifier, the first identifier may be used to indicate the type of the first service data, and the first service type includes, but is not limited to, the safety-related internet of vehicles service and the non-safety-related internet of vehicles service.

The first identifier is the carrier frequency indication identifier, the carrier frequency indication identifier may be used to indicate a transmission carrier frequency type of the first service data, and the transmission carrier frequency type includes, but is not limited to, a licensed spectrum, an unlicensed spectrum, a safety transmission carrier frequency, and a non-safety transmission carrier frequency.

The priority identifier is used to indicate a priority of the first service data, and first service data with a higher priority may be preferentially transmitted.

Optionally, the priority identifier may alternatively be used to indicate the service type of the first service data. For example, first service data with priority identifiers 1, 2, 3, and 4 belongs to the safety-related internet of vehicles service, and first service data with other priority identifiers belongs to the non-safety-related internet of vehicles service.

The first identifier is the destination address identifier. For example, a destination address identifier of the safety-related internet of vehicles service belongs to a first dedicated destination address identifier or a first dedicated destination address identifier set, and a destination address identifier of the non-safety-related internet of vehicles service belongs to a second dedicated destination address identifier or a second dedicated destination address identifier set.

In an optional embodiment, the first identifier may be indicated by using a fixed indicator field of a data structure to which at least one of the service type identifier, the destination address identifier, the source address identifier, the priority identifier, the carrier frequency indication identifier, and the channel indication identifier belongs.

In an optional embodiment, the first identifier may be indicated by using a fixed indicator field of a data structure to which the service type identifier, the destination address identifier, the source address identifier, the priority identifier, the carrier frequency indication identifier, or the channel indication identifier belongs.

For example, the destination address identifier is used as an example, the destination address identifier occupies a field of 24 bits, and the first identifier may be indicated by using one or more bits of the 24 bits.

Step 230: The first communications node determines, based on the first identifier and the first transmission carrier frequency identifier, a first transmission carrier frequency used to transmit the first service data.

In an optional embodiment, the transmission carrier frequency configuration information of the first service type further includes a threshold. When the first identifier is greater than or equal to the threshold, the first transmission carrier frequency used to transmit the first service data is determined based on the first transmission carrier frequency identifier corresponding to the threshold. Alternatively, when the first identifier is less than the threshold, the first transmission carrier frequency used to transmit the first service data is determined based on the first transmission carrier frequency identifier corresponding to the threshold.

In an optional embodiment, when determining, based on the first identifier, that the service type of the first service data is the first service type, the first communications node determines, based on the first transmission carrier frequency identifier, the first transmission carrier frequency used to transmit the first service data.

Specifically, the threshold may be preset based on classification of the first service type.

For example, services are classified into four types, each type corresponds to one identifier, and the four identifiers are 1, 2, 3, and 4. It is assumed that the threshold is set as follows: the first transmission carrier frequency identifier corresponds to a first transmission carrier frequency 1. When an identifier is greater than or equal to the threshold, a service type with the identifier 3 and a service type with the identifier 4 may be transmitted on the first transmission carrier frequency 1. When an identifier is less than the threshold, a service type with the identifier 1 and a service type with the identifier 2 may be transmitted on the first transmission carrier frequency 1. Optionally, a value of the first identifier may be quantified based on a use requirement.

In an optional embodiment, before step 230, the service data transmission method includes step 2310: The first communications node receives, from a base station, transmission carrier frequency list information that is sent by the base station by using system broadcast information or RRC dedicated signaling, where the transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

Specifically, before step 230 is performed, for example, step 2310 is performed before step 210, or step 210 and step 2310 are performed at the same time, or step 2310 is performed between step 210 and step 220, or step 220 and step 2310 are performed at the same time. A sequence of performing step 2310 and steps 210 and 220 does not affect a performing result. Therefore, a sequence of performing step 2310 is not limited.

Further, the first communications node receives the transmission carrier frequency list information that is sent by the base station by using the system broadcast information or the RRC dedicated signaling. The transmission carrier frequency list information includes the at least one second transmission carrier frequency identifier. The first transmission carrier frequency identifier corresponding to the first transmission carrier frequency is one of the second transmission carrier frequency identifier included in the transmission carrier frequency list information.

In an optional embodiment, the transmission carrier frequency configuration information of the first service type includes at least one second identifier corresponding to the at least one first transmission carrier frequency identifier; and when the first identifier is the second identifier, the first communications node determines, based on the first transmission carrier frequency identifier corresponding to the second identifier, the first transmission carrier frequency used to transmit the first service data.

Specifically, when the first identifier is the second identifier corresponding to the first transmission carrier frequency identifier, it may be determined that the service type of the first service data is the same as the first service type. Further, the first communications node determines, based on the first transmission carrier frequency identifier, the first transmission carrier frequency used to transmit the first service data.

Optionally, for a correspondence between the first transmission carrier frequency identifier and the second identifier, for example, the correspondence between the first transmission carrier frequency identifier and the second identifier may be: One second identifier corresponds to a plurality of first transmission carrier frequency identifiers, or one second identifier corresponds to one first transmission carrier frequency identifier, or a plurality of second identifiers correspond to one first transmission carrier frequency identifier. Specific correspondences are not enumerated one by one.

Assuming that one second identifier corresponds to one first transmission carrier frequency identifier, the first communications node determines, based on the first transmission carrier frequency identifier corresponding to the second identifier, the first transmission carrier frequency used to transmit the first service data.

Assuming that one second identifier corresponds to a plurality of first transmission carrier frequency identifiers, the first communications node selects a first transmission carrier frequency identifier from the first transmission carrier frequency identifiers corresponding to the second identifier, and transmits the first service data on a first transmission carrier frequency corresponding to the transmission carrier frequency identifier.

In an optional embodiment, when the transmission carrier frequency configuration information of the first service type includes one first transmission carrier frequency identifier, the first communications node determines, based on the first identifier and the first transmission carrier frequency identifier, that the first transmission carrier frequency used to transmit first service data includes one transmission carrier frequency, and the first communications node transmits the first service data on the transmission carrier frequency.

In an optional embodiment, when the transmission carrier frequency configuration information of the first service type includes at least two first transmission carrier frequency identifiers, the first communications node determines, based on the first identifier and the first transmission carrier frequency identifiers, that the first transmission carrier frequency used to transmit first service data includes at least two transmission carrier frequencies, and selects a transmission carrier frequency from the at least two transmission carrier frequencies to transmit the first service data.

Only three manners of selecting a transmission carrier frequency from the at least two transmission carrier frequencies are enumerated below.

In an optional embodiment, the first communications node may randomly select a carrier frequency from first transmission carrier frequencies as a transmission carrier frequency for transmitting the first service data.

In an optional embodiment, the first communications node may select a carrier frequency based on load statuses of first transmission carrier frequencies as a transmission carrier frequency for transmitting the first service data.

In an optional embodiment, the first communications node may request the base station to allocate a carrier frequency as a transmission carrier frequency for transmitting the first service data.

Step 240: The first communications node transmits the first service data on the first transmission carrier frequency.

Optionally, a method for transmitting the first service data on the first transmission carrier frequency by the first communications node includes, but is not limited to, communication through direct connection between first communications nodes and communication through forwarding by the base station.

In addition, when the service type, indicated by the first identifier, of the first service data is not the first service type, the first service data is not transmitted on the first transmission carrier frequency.

When different first service data corresponds to different transmission carrier frequencies, independent transmission mechanisms need to run on the access stratum for the different first service data.

For example, the first communications node determines, based on a first identifier 1 that is delivered together with a first service data packet 1 by the protocol layer above the access stratum to the access stratum, that the first service data packet 1 needs to be transmitted on a transmission carrier frequency 1, and the first communications node determines, based on a first identifier 2, that a first service data packet 2 needs to be transmitted on a transmission carrier frequency 2. The first communications node respectively obtains independent transmission resources on the transmission carrier frequency 1 and the transmission carrier frequency 2 for the first service data packet 1 and the first service data packet 2 to transmit the first service data packet 1 and the first service data packet 2.

In an optional embodiment, when data multiplexing is performed at the access stratum, first service data to be transmitted on a same transmission carrier frequency may be encapsulated into a same media access control (MAC) protocol packet data unit (MAC PDU). However, data that needs to be transmitted on different transmission carrier frequencies cannot be encapsulated into a same MAC PDU.

Specifically, when data multiplexing is performed at the access stratum, to be specific, different first service data is transmitted on a same transmission carrier frequency, and the first service data may be encapsulated into a same MAC PDU, thereby shortening a time for transmitting the first service data, avoiding transmission of different types of first service data on a same transmission carrier frequency, and meeting a spectrum usage rule.

Optionally, an encapsulation principle for encapsulating first service data into a MAC PDU includes, but is not limited to, a V2X or device-to-device (D2D) encapsulation mechanism, or an encapsulation mechanism based on a logical token bucket in a cellular network.

In this embodiment of this application, through the foregoing example, in the service data transmission method provided in this embodiment of the present invention, the transmission carrier frequency configuration information of the first service type includes the at least one first transmission carrier frequency identifier, so that the first communications node can determine, by using the obtained first identifier and the first transmission carrier frequency identifier, the first transmission carrier frequency used to transmit the first service data.

Figure 4:
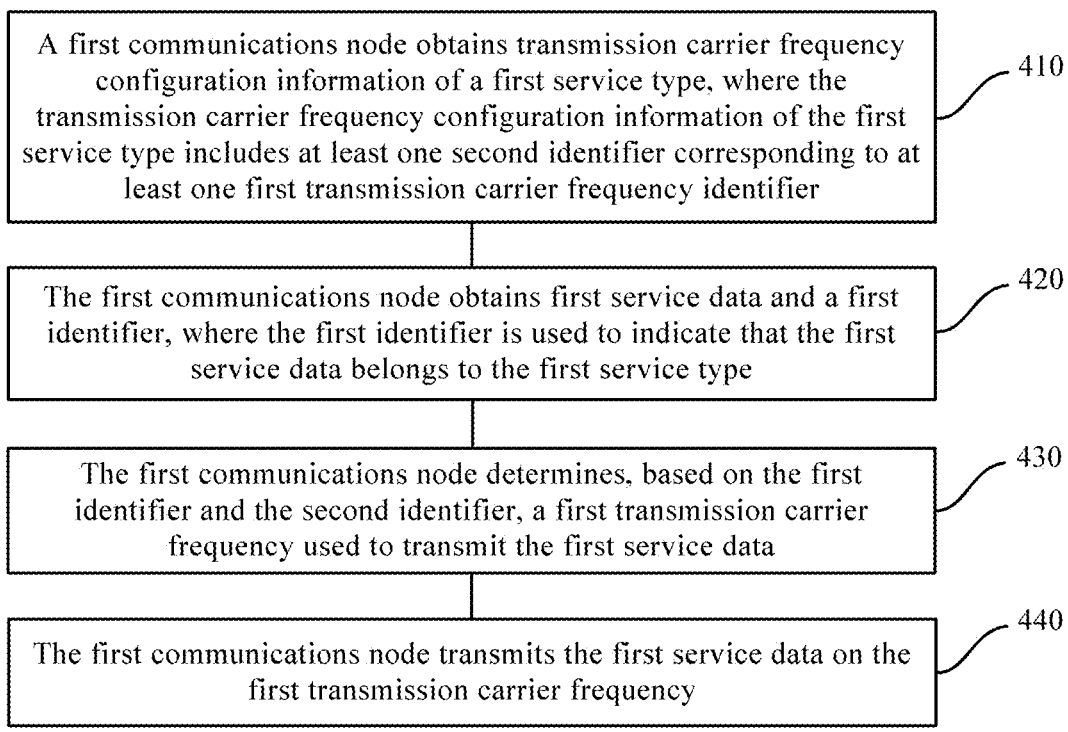
FIG. 4 is a flowchart of still another data transmission method according to an embodiment of the present invention.

A solution provided in an embodiment of the present invention is described below in detail with reference to FIG. 4. FIG. 4 is a flowchart of still another service data transmission method according to an embodiment of the present invention. In this embodiment of the present invention, the method is performed by a first communications node. As shown in FIG. 4, this embodiment specifically includes the following steps.

Step 410: The first communications node obtains transmission carrier frequency configuration information of a first service type, where the transmission carrier frequency configuration information of the first service type includes at least one second identifier corresponding to at least one first transmission carrier frequency identifier. A transmission carrier frequency corresponding to the first transmission carrier frequency identifier is used to transmit service data of the first service type.

A description of a manner of obtaining the transmission carrier frequency configuration information of the first service type by the first communications node in this step is the same as the description of the manner of obtaining the transmission carrier frequency configuration information of the first service type by the first communications node in step 210 in FIG. 2. For a specific description, refer to the description in step 210 in FIG. 2. For brevity of description, details are not described herein again.

In this embodiment of this application, the transmission carrier frequency configuration information of the first service type includes the at least one second identifier corresponding to the at least one first transmission carrier frequency identifier. For example, a correspondence between the first transmission carrier frequency identifier and the second identifier may be: one second identifier corresponds to one first transmission carrier frequency identifier, or a plurality of first transmission carrier frequency identifiers correspond to one second identifier, or a plurality of second identifiers corresponds to one first transmission carrier frequency identifier. Specific correspondences are not enumerated one by one.

Step 420: The first communications node obtains first service data and a first identifier, where the first identifier is used to indicate that the first service data belongs to the first service type.

A description of a manner of obtaining the first service data and the first identifier by the first communications node in this step is the same as the description of the manner of obtaining the first service data and the first identifier by the first communications node in step 220 in FIG. 2. For a specific description, refer to the description in step 220 in FIG. 2. For brevity of description, details are not described herein again.

In an optional embodiment, the first identifier may include at least one of a destination address identifier, a source address identifier, a service type identifier, a priority identifier, a carrier frequency indication identifier, and a channel indication identifier of the first service data.

In an optional embodiment, the first identifier may be the destination address identifier, the source address identifier, the service type identifier, the priority identifier, the carrier frequency indication identifier, or the channel indication identifier of the first service data.

For example, the first identifier is the service type identifier, the first identifier may be used to indicate a type of the first service data, and the service type includes, but is not limited to, a safety-related internet of vehicles service and a non-safety-related internet of vehicles service.

The first identifier is the carrier frequency indication identifier, the carrier frequency indication identifier may be used to indicate a transmission carrier frequency type of the first service data, and the transmission carrier frequency type includes, but is not limited to, a licensed spectrum, an unlicensed spectrum, a safety transmission carrier frequency, and a non-safety transmission carrier frequency.

The priority identifier is used to indicate a priority of the first service data, and first service data with a higher priority may be preferentially transmitted.

Optionally, the priority identifier may alternatively be used to indicate the service type of the first service data. For example, first service data with priority identifiers 1, 2, 3, and 4 belongs to the safety-related internet of vehicles service, and first service data with another priority identifier belongs to the non-safety-related internet of vehicles service.

The first identifier is the destination address identifier. For example, a destination address identifier of the safety-related internet of vehicles service belongs to a first dedicated destination address identifier or a first dedicated destination address identifier set, and a destination address identifier of the non-safety-related internet of vehicles service belongs to a second dedicated destination address identifier or a second dedicated destination address identifier set.

In an optional embodiment, the first identifier may be indicated by using a fixed indicator field of a data structure to which at least one of the service type identifier, the destination address identifier, the source address identifier, the priority identifier, the carrier frequency indication identifier, and the channel indication identifier belongs.

In an optional embodiment, the first identifier may be indicated by using a fixed indicator field of a data structure to which the service type identifier, the destination address identifier, the source address identifier, the priority identifier, the carrier frequency indication identifier, or the channel indication identifier belongs.

For example, the destination address identifier is used as an example, the destination address identifier occupies a field of 24 bits, and the first identifier of the corresponding first service data may be indicated by using one or more bits of the 24 bits.

Step 430: The first communications node determines, based on the first identifier and the second identifier, a first transmission carrier frequency used to transmit the first service data.

In an optional embodiment, when the first identifier is the second identifier, the first communications node determines, based on the first transmission carrier frequency identifier corresponding to the second identifier, the first transmission carrier frequency used to transmit the first service data.

Step 440: The first communications node transmits the first service data on the first transmission carrier frequency.

A description of a manner of transmitting the first service data on the first transmission carrier frequency by the first communications node in this step is the same as the description of the manner of transmitting the first service data on the first transmission carrier frequency by the first communications node in step 240 in FIG. 2. For a specific description, refer to the description in step 240 in FIG. 2. For brevity of description, details are not described herein again.

Optionally, before step 430, the service data transmission method includes step 4310: The first communications node receives, from a base station, transmission carrier frequency list information that is sent by the base station by using system broadcast information or RRC dedicated signaling, where the transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

Specifically, before step 430 is performed, for example, step 4310 is performed before step 410, or step 410 and step 4310 are performed at the same time, or step 4310 is performed between step 410 and step 420, or step 420 and step 4310 are performed at the same time. A sequence of performing step 4310 and steps 410 and 420 does not affect a performing result. Therefore, a sequence of performing step 4310 is not limited.

Further, the first communications node receives the transmission carrier frequency list information that is sent by the base station by using the system broadcast information or the RRC dedicated signaling. The transmission carrier frequency list information includes the at least one second transmission carrier frequency identifier. The first transmission carrier frequency identifier corresponding to the first transmission carrier frequency is one of the second transmission carrier frequency identifier included in the transmission carrier frequency list information.

In the method in this embodiment, when the first communications node obtains the first service data, the first service data corresponds to different transmission frequencies.

The first identifier is used to indicate that the first service data belongs to the first service type. After determining the service type of the first service data, the first communications node transmits the first service data on the corresponding first transmission carrier frequency. In this way, the first communications node selects the transmission carrier frequency based on the service type, thereby meeting a spectrum usage rule of a particular region.

In this embodiment of this application, through the foregoing embodiment, in the service data transmission method provided in this embodiment of the present invention, the transmission carrier frequency configuration information of the first service type includes the at least one first transmission carrier frequency identifier, so that the first communications node can determine, by using the obtained first identifier and the second identifier corresponding to the first transmission carrier frequency identifier, the first transmission carrier frequency used to transmit the first service data.

Figure 5:
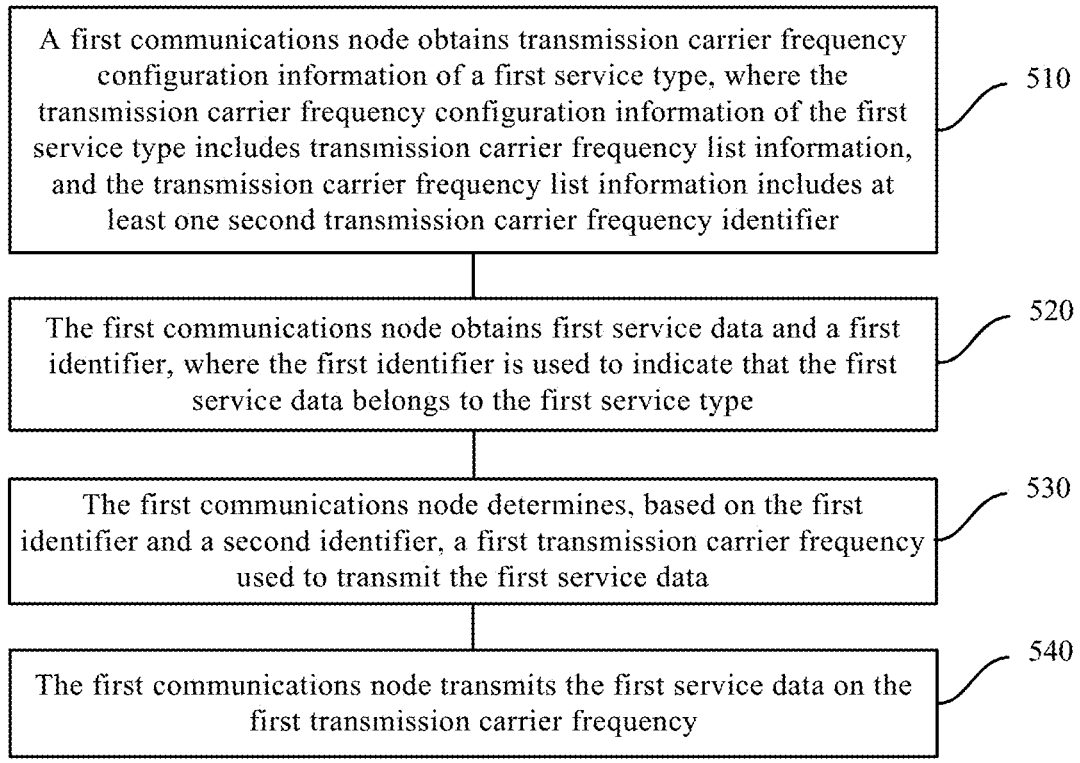
FIG. 5 is a flowchart of yet another data transmission method according to an embodiment of the present invention.

A solution provided in an embodiment of the present invention is described below in detail with reference to FIG. 5. FIG. 5 is a flowchart of yet another service data transmission method according to an embodiment of the present invention. In this embodiment of the present invention, the method is performed by a first communications node. As shown in FIG. 5, this embodiment specifically includes the following steps.

Step 510: The first communications node obtains transmission carrier frequency configuration information of a first service type, where the transmission carrier frequency configuration information of the first service type includes transmission carrier frequency list information, and the transmission carrier frequency list information includes at least one second transmission carrier frequency identifier.

A description of a manner of obtaining the transmission carrier frequency configuration information of the first service type by the first communications node in this step is the same as the description of the manner of obtaining the transmission carrier frequency configuration information of the first service type by the first communications node in step 210 in FIG. 2. For a specific description, refer to the description in step 210 in FIG. 2. For brevity of description, details are not described herein again.

In this embodiment of this application, the transmission carrier frequency configuration information of the first service type includes the transmission carrier frequency list information, and the transmission carrier frequency list information includes the at least one second transmission carrier frequency identifier.

In an optional embodiment, a first transmission carrier frequency identifier corresponding to a first transmission carrier frequency is one of the second transmission carrier frequency identifier included in the transmission carrier frequency list information.

Step 520: The first communications node obtains first service data and a first identifier, where the first identifier is used to indicate that the first service data belongs to the first service type.

A description of a manner of obtaining the first service data and the first identifier by the first communications node in this step is the same as the description of the manner of obtaining the first service data and the first identifier by the first communications node in step 220 in FIG. 2. For a specific description, refer to the description in step 220 in FIG. 2. For brevity of description, details are not described herein again.

In an optional embodiment, when the first communications node receives a first service data packet that is delivered by a protocol layer above an access stratum to the access stratum, information used to indicate a service type of the first service data, namely, the first identifier, is also transmitted to the access stratum.

Specifically, the protocol layer above the access stratum may be, for example, in a protocol form such as a network transmission layer, an application layer, or a network adaptation layer, or may be a protocol layer above a physical protocol layer, a media access control protocol layer, a radio link transmission protocol layer, or a packet data convergence protocol layer. A specific implementation form is not limited herein.

In an optional embodiment, the first identifier may include at least one of a destination address identifier, a source address identifier, a service type identifier, a priority identifier, a carrier frequency indication identifier, and a channel indication identifier of the first service data.

In an optional embodiment, the first identifier may be the destination address identifier, the source address identifier, the service type identifier, the priority identifier, the carrier frequency indication identifier, or the channel indication identifier of the first service data.

For example, the first identifier is the service type identifier, the first identifier may be used to indicate the type of the first service data, and the first service type includes, but is not limited to, a safety-related internet of vehicles service and a non-safety-related internet of vehicles service.

Step 530: The first communications node determines, based on the first identifier and the transmission carrier frequency configuration information, a first transmission carrier frequency used to transmit the first service data.

In an optional embodiment, when the first identifier is a second identifier, the first communications node determines, based on a first transmission carrier frequency identifier corresponding to the second identifier, the first transmission carrier frequency used to transmit the first service data.

Specifically, when the first identifier is the second identifier corresponding to the first transmission carrier frequency identifier, it may be determined that the service type of the first service data is the same as the first service type. Further, the first communications node determines, based on the first transmission carrier frequency identifier, the first transmission carrier frequency used to transmit the first service data.

Step 540: The first communications node transmits the first service data on the first transmission carrier frequency.

A description of a manner of transmitting the first service data on the first transmission carrier frequency by the first communications node in this step is the same as the description of the manner of transmitting the first service data on the first transmission carrier frequency by the first communications node in step 240 in FIG. 2. For a specific description, refer to the description in step 240 in FIG. 2. For brevity of description, details are not described herein again.

In this embodiment of this application, through the foregoing example, in the service data transmission method provided in this embodiment of the present invention, the first transmission carrier frequency identifier corresponding to the first transmission carrier frequency is an identifier in transmission configuration list information, so that the first communications node can determine, by using the obtained first identifier and the second transmission carrier frequency identifier, the first transmission carrier frequency used to transmit the first service data.

Figure 6:
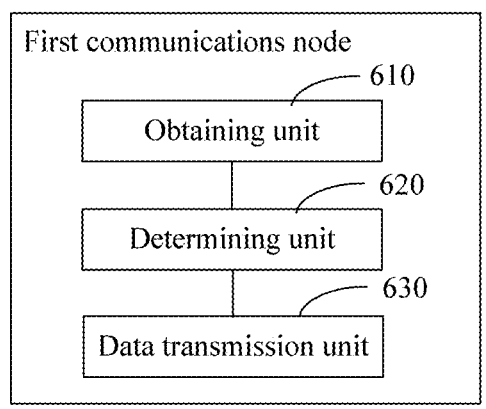
FIG. 6 is an architectural diagram of a first communications node according to an embodiment of the present invention.

According to the method described in the foregoing embodiment, the first communications node can determine the first transmission carrier frequency used to transmit the first service data. Correspondingly, an embodiment of the present invention provides a first communications node, to implement the service data transmission method provided in the foregoing embodiment. As shown in FIG. 6, the first communications node includes: an obtaining unit 610, a determining unit 620, and a data transmission unit 630.

The obtaining unit 610 is configured to obtain transmission carrier frequency configuration information of a first service type. The transmission carrier frequency configuration information of the first service type includes at least one first transmission carrier frequency identifier, and a transmission carrier frequency corresponding to the first transmission carrier frequency identifier is used to transmit service data of the first service type.

The obtaining unit 610 is further configured to obtain first service data and a first identifier. The first identifier is used to indicate that the first service data belongs to the first service type.

The determining unit 620 is configured to determine, based on the first identifier and the first transmission carrier frequency identifier, a first transmission carrier frequency used to transmit the first service data.

The data transmission unit 630 is configured to transmit the first service data on the first transmission carrier frequency.

In this embodiment of this application, through the foregoing example, according to the first communications node provided in this embodiment of the present invention, the first communications node can obtain the transmission carrier frequency configuration information that is of the first service type and that is preconfigured or prestored or is sent by a base station, where the transmission carrier frequency configuration information of the first service type includes at least one piece of first transmission carrier frequency configuration information; and further determine, by using the first identifier used to indicate that the first service data belongs to the first service type, the first transmission carrier frequency used to transmit the first service data.

Optionally, the obtaining unit 610 is further configured to obtain the first service data and the first identifier that are sent at a protocol layer above an access stratum.

Optionally, when determining, based on the first identifier, that the first service data belongs to a first service, the determining unit 620 is configured to determine, based on the first transmission carrier frequency identifier, the first transmission carrier frequency used to transmit the first service data.

Optionally, the transmission carrier frequency configuration information of the first service type further includes at least one second identifier corresponding to the at least one first transmission carrier frequency identifier; and specifically, the determining unit 620 is configured to: when the first identifier is the second identifier, determine, based on the first transmission carrier frequency identifier corresponding to the second identifier, the first transmission carrier frequency used to transmit the first service data.

Optionally, the transmission carrier frequency configuration information of the first service type further includes a threshold; and when the first identifier is greater than or equal to the threshold, the determining unit 620 is configured to determine, based on the first transmission carrier frequency identifier, the first transmission carrier frequency used to transmit the first service data; or when the first identifier is less than the threshold, the determining unit 620 is configured to determine, based on the first transmission carrier frequency identifier corresponding to the threshold, the first transmission carrier frequency used to transmit the first service data.

Optionally, the first identifier includes at least one of a service type identifier, a destination address identifier, a source address identifier, a priority identifier, a carrier frequency indication identifier, and a channel indication identifier.

Optionally, the first identifier is indicated by using a fixed indicator field of a data structure to which at least one of the service type identifier, the destination address identifier, the source address identifier, the priority identifier, the carrier frequency indication identifier, and the channel indication identifier belongs.

Optionally, when the transmission carrier frequency configuration information of the first service type includes at least two first transmission carrier frequency identifiers, the determining unit 620 is configured to: randomly select a transmission carrier frequency corresponding to one of the at least two first transmission carrier frequency identifiers to transmit the first service data; or select, based on resource load statuses of transmission carrier frequencies corresponding to the at least two first transmission carrier frequency identifiers, a transmission carrier frequency corresponding to one of the at least two first transmission carrier frequency identifiers to transmit the service.

Optionally, the first communications node further includes a receiving unit, and the receiving unit is configured to: receive, from a base station, transmission carrier frequency list information that is sent by the base station by using system broadcast information or radio resource control protocol RRC dedicated signaling, where the transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

Optionally, the obtaining unit 610 is further configured to: obtain the transmission carrier frequency configuration information of the first service type by receiving system broadcast information or radio resource control protocol RRC dedicated control signaling of the base station or control information sent by a core network control node; or obtain the transmission carrier frequency configuration information of the first service type by using preconfigured or prestored information; or obtain the transmission carrier frequency configuration information of the first service type by receiving configuration information of the protocol layer above the access stratum.

Optionally, the first service data is a safety-related service or a non-safety-related service.

Optionally, when a service type, indicated by the first identifier, of the first service data is not the first service type, the data transmission unit does not transmit the first service data on the first transmission carrier frequency.

In addition, the first communications node provided in this embodiment of the present invention may alternatively be implemented in the following manner, to implement the communication method provided in the foregoing embodiment of the present invention. As shown in FIG. 7, the first communications node includes: a receiver 710, a processor 720, a memory 730, and a transmitter 740.

In an optional embodiment, the obtaining unit 610 in the foregoing embodiment of FIG. 6 may be replaced with the receiver 710 or the memory 740. Specifically, the transmission carrier frequency configuration information of the first service type is preconfigured information in the memory 730 or information received by the receiver 710 from the base station or the core network node, where the transmission carrier frequency configuration information of the first service type includes the at least one first transmission carrier frequency identifier. The obtaining unit 610 may be replaced with the receiver 710. Specifically, the first service data and the first identifier, where the first identifier is used to indicate that the first service data belongs to the first service type.

The determining unit 620 may be replaced with the processor 720. The data transmission unit 630 may be replaced with the receiver 710 or the transmitter 740.

For a processing process of each unit in FIG. 7, refer to the foregoing specific embodiments shown in FIG. 2 to FIG. 5. Details are not described herein again.

A solution provided in an embodiment of the present invention is described below in detail with reference to FIG. 8. FIG. 8 is a flowchart of a service data transmission method according to an embodiment of the present invention. In this embodiment of the present invention, the method is performed by a base station. As shown in FIG. 8, this embodiment specifically includes the following step:

Step 810: The base station sends transmission carrier frequency configuration information of a first service type to a first communications node, where the transmission carrier frequency configuration information of the first service type includes at least one first transmission carrier frequency identifier, the first transmission carrier frequency identifier is used by the first communications node to determine, based on first service data and a first identifier that are obtained by the first communications node and the first transmission carrier frequency identifier, a first transmission carrier frequency used to transmit the first service data, and the first identifier is used to indicate that the first service data belongs to the first service type.

In an optional embodiment, the transmission carrier frequency configuration information of the first service type further includes at least one second identifier corresponding to the at least one first transmission carrier frequency identifier, and the second identifier is used to indicate that a transmission carrier frequency corresponding to the first transmission carrier frequency identifier supports transmission of service data of the first service type.

In an optional embodiment, the transmission carrier frequency configuration information of the first service type further includes a threshold, and the threshold is used to instruct the first communications node to: when the first identifier is greater than or equal to the threshold, determine, based on the first transmission carrier frequency identifier corresponding to the threshold, the first transmission carrier frequency used to transmit the first service data.

In an optional embodiment, the base station sends transmission carrier frequency list information to the first communications node by using system broadcast information or RRC dedicated signaling. The transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

In this embodiment of this application, through the foregoing example, in the service data transmission method provided in this embodiment of the present invention, the transmission carrier frequency configuration information of the first service type is sent, and the transmission carrier frequency configuration information of the first service type includes the at least one first transmission carrier frequency identifier, so that the first communications node can determine, by using the obtained first identifier and the first transmission carrier frequency identifier, the first transmission carrier frequency used to transmit the first service data.

Correspondingly, an embodiment of the present invention provides a base station, to implement the service data transmission method provided in the foregoing embodiment. As shown in FIG. 9, the base station includes a sending unit 910.

The sending unit 910 is configured to send transmission carrier frequency configuration information of a first service type to a first communications node. The transmission carrier frequency configuration information of the first service type includes at least one first transmission carrier frequency identifier, the first transmission carrier frequency identifier is used by the first communications node to determine, based on first service data and a first identifier that are obtained by the first communications node and the first transmission carrier frequency identifier, a first transmission carrier frequency used to transmit the first service data, and the first identifier is used to indicate that the first service data belongs to the first service type.

In this embodiment of this application, through the foregoing example, according to the base station provided in this embodiment of the present invention, the base station sends the transmission carrier frequency configuration information of the first service type, where the transmission carrier frequency configuration information of the first service type includes at least one piece of first transmission carrier frequency configuration information, and further determines, by using the first identifier used to indicate that the first service data belongs to the first service type, the first transmission carrier frequency used to transmit the first service data.

Optionally, the transmission carrier frequency configuration information of the first service type further includes at least one second identifier corresponding to the at least one first transmission carrier frequency identifier, and the second identifier is used to indicate that a transmission carrier frequency corresponding to the first transmission carrier frequency identifier supports transmission of service data of the first service type.

Optionally, the transmission carrier frequency configuration information of the first service type further includes a threshold, and the threshold is used to instruct the first communications node to: when the first identifier is greater than or equal to the threshold, determine, based on the first transmission carrier frequency identifier corresponding to the threshold, the first transmission carrier frequency used to transmit the first service data.

Optionally, the sending unit 910 is further configured to send transmission carrier frequency list information to the first communications node by using system broadcast information or RRC dedicated signaling. The transmission carrier frequency list information includes at least one second transmission carrier frequency identifier, and the first transmission carrier frequency identifier corresponding to the first transmission carrier frequency is one of the second transmission carrier frequency identifier included in the transmission carrier frequency list information.

In addition, the base station provided in this embodiment of the present invention may alternatively be implemented in the following manner, to implement the communication method provided in the foregoing embodiment of the present invention. As shown in FIG. 10, the first communications node includes a transmitter 1010.

In an optional embodiment, the sending unit 910 in the foregoing embodiment of FIG. 9 may be replaced with the transmitter 1010. Specifically, the transmitter 1010 is configured to send the transmission carrier frequency configuration information of the first service type to the first communications node. The transmission carrier frequency configuration information of the first service type includes the at least one first transmission carrier frequency identifier.

For a processing process of each unit in FIG. 9, refer to the foregoing specific embodiments shown in FIG. 2 to FIG. 5. Details are not described herein again.

According to the service data transmission method, the first communications node, and the base station that are provided in the embodiments of the present invention, when the first communications node needs to transmit the first service data, the first communications node determines, based on the at least one first transmission carrier frequency identifier included in the transmission carrier frequency configuration information of the first service type and the first identifier, the first transmission carrier frequency used to transmit the first service data, where the first identifier is used to indicate that the first service data belongs to the first service type; and transmits the first service data on the first transmission carrier frequency. In this way, a spectrum usage rule is met.

A person skilled in the art may be further aware that, with reference to units and algorithm steps of the examples described in the embodiments disclosed in this specification, this application may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing descriptions are merely examples of specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
   receiving, by a first communications node, a first message including transmission carrier frequency configuration information of a first service type, wherein the transmission carrier frequency configuration information of the first service type comprises at least one first transmission carrier frequency identifier;
   receiving, by the first communications node, a second message including first service data and a first identifier, wherein the first identifier indicates that the first service data belongs to the first service type, wherein the first identifier comprises a priority identifier that uniquely identifies the first service type, wherein the first service data and the first identifier including the priority identifier are received together in the second message as a single message, wherein the first message and the second message are separate messages, wherein the priority identifier is one of a set of priority identifiers, and wherein the set of priority identifiers correspond to the first service type, wherein the receiving the second message including the first service data and the first identifier comprises:
      receiving the first service data and the first identifier in the second message at a protocol layer above an access stratum sent by a second communications node;
   determining, by the first communications node based on the first identifier in the second message and the first transmission carrier frequency identifier in the first message, a first transmission carrier frequency corresponding to the first transmission carrier frequency identifier, wherein, when the transmission carrier frequency configuration information of the first service type comprises at least two first transmission carrier frequency identifiers, the determining comprises:

selecting, by the first communications node based on resource load statuses of transmission carrier frequencies corresponding to the at least two first transmission carrier frequency identifiers, the first transmission carrier frequency corresponding to one of the at least two first transmission carrier frequency identifiers to transmit service data; and transmitting, by the first communications node, the first service data on the first transmission carrier frequency.

2. The method according to claim 1, wherein the determining comprises:
determining, based on the first identifier, that a service type of the first service data is the first service type.

3. The method according to claim 1,
wherein the transmission carrier frequency configuration information of the first service type further comprises at least one second identifier corresponding to the at least one first transmission carrier frequency identifier, and
wherein the determining comprises:
determining the first transmission carrier frequency when the first identifier is the second identifier.

4. The method according to claim 1,
wherein the transmission carrier frequency configuration information of the first service type further comprises a threshold, and
wherein the determining comprises:
determining the first transmission carrier frequency when the first identifier is greater than or equal to the threshold, or
determining the first transmission carrier frequency when the first identifier is less than the threshold.

5. The method according to claim 1, wherein the first identifier further comprises at least one of a service type identifier, a destination address identifier, a source address identifier, a carrier frequency indication identifier, or a channel indication identifier.

6. The method according to claim 1, wherein the transmitting further comprises:
skipping, by the first communications node, transmitting the first service data on the first transmission carrier frequency when a service type, indicated by the first identifier, of the first service data is not the first service type.

7. The method of claim 1,
wherein the first transmission carrier frequency is a unicast transmission carrier frequency,
wherein the receiving the first message comprises receiving, from a base station, the first message, and
wherein the transmitting comprises transmitting, to the base station, the first service data on the first transmission carrier frequency.

8. The method of claim 1,
wherein the first identifier further includes at least one of a destination address identifier, a source address identifier, a carrier frequency indication identifier, or a channel indication identifier sent at the protocol layer above the access stratum, and
the method further comprising:
receiving, by the first communications node, a third message including second transmission carrier frequency configuration information of a second service type different from the first service type,
wherein the second transmission carrier frequency configuration information of the second service type comprises at least one second transmission carrier frequency identifier;
receiving, by the first communications node, a fourth message including second service data and a second identifier, wherein the second identifier indicates that the second service data belongs to the second service type, wherein the second identifier includes a second priority identifier that uniquely identifies the second service type;
determining, by the first communications node based on the second identifier in the fourth message and the second transmission carrier frequency identifier in the third message, a second transmission carrier frequency corresponding to the second transmission carrier frequency identifier; and
transmitting, by the first communications node, the second service data on the second transmission carrier frequency.

9. The method of claim 1, wherein the first service type uniquely identified by the priority identifier is a service type for one of a plurality of V2X services, or a service type different from the plurality of V2X services.

10. The method of claim 1, the transmission carrier frequencies being associated with a same radio access technology (RAT), the transmission carrier frequencies being of a same licensed spectrum or of a same unlicensed spectrum.

11. A method comprising:
sending, by a base station, a first message including transmission carrier frequency configuration information of a first service type to a first communications node,
wherein the transmission carrier frequency configuration information of the first service type comprises at least one first transmission carrier frequency identifier in the first message, the first transmission carrier frequency identifier indicating to the first communications node to determine, based on first service data and a first identifier in a second message received by the first communications node and based on the first transmission carrier frequency identifier in the first message, a first transmission carrier frequency used to transmit the first service data, the first identifier indicating that the first service data belongs to the first service type,
wherein the first identifier includes a priority identifier that uniquely identifies the first service type,
wherein the first service data and the first identifier including the priority identifier are received together in the second message as a single message at a protocol layer above an access stratum sent by a second communications node,
wherein the first message and the second message are separate messages,
wherein the priority identifier is one of a set of priority identifiers,
wherein the set of priority identifiers correspond to the first service type, and
wherein, when the transmission carrier frequency configuration information of the first service type comprises at least two first transmission carrier frequency identifiers, the first communications node selects based on resource load statuses of transmission carrier frequencies corresponding to the at least two first transmission carrier frequency identifiers, the first transmission carrier frequency corresponding to one of the at least two first transmission carrier frequency identifiers to transmit service data.

12. The method according to claim 11, wherein the transmission carrier frequency configuration information of the first service type further comprises at least one second identifier corresponding to the at least one first transmission carrier frequency identifier, and wherein the second identifier indicates that a transmission carrier frequency corresponding to the first transmission carrier frequency identifier supports transmission of service data of the first service type.

13. A first communications node comprising:
    at least one processor; and
    a non-transitory computer readable storage medium storing programming for execution by the at least one processor, the programming including instructions to cause the first communications node to perform operations including:
        receiving a first message including transmission carrier frequency configuration information of a first service type, wherein the transmission carrier frequency configuration information of the first service type comprises at least one first transmission carrier frequency identifier, and
        receiving a second message including first service data and a first identifier, wherein the first identifier indicates that the first service data belongs to the first service type, wherein the first identifier includes a priority identifier that uniquely identifies the first service type, wherein the first service data and the first identifier including the priority identifier are received together in the second message as a single message, wherein the first message and the second message are separate messages, wherein the priority identifier is one of a set of priority identifiers, and wherein the set of priority identifiers correspond to the first service type, wherein the receiving the second message including the first service data and the first identifier comprises:
            receiving the first service data and the first identifier in the second message at a protocol layer above an access stratum sent by a second communications node;
        determining, based on the first identifier in the second message and the first transmission carrier frequency identifier in the first message, a first transmission carrier frequency corresponding to the first transmission carrier frequency identifier, wherein, when the transmission carrier frequency configuration information of the first service type comprises at least two first transmission carrier frequency identifiers, the determining comprises:
            selecting, based on resource load statuses of transmission carrier frequencies corresponding to the at least two first transmission carrier frequency identifiers, the first transmission carrier frequency corresponding to one of the at least two first transmission carrier frequency identifiers to transmit service data; and
        transmitting the first service data on the first transmission carrier frequency.

14. The first communications node according to claim 13, wherein the determining comprises:
    determining, based on the first transmission carrier frequency identifier in the first message, the first transmission carrier frequency when it is determined, based on the first identifier in the second message, that the first service data belongs to the first service type.

15. The first communications node according to claim 13, wherein the transmission carrier frequency configuration information of the first service type further comprises at least one second identifier corresponding to the at least one first transmission carrier frequency identifier, and wherein the determining comprises:
    determining, based on the first transmission carrier frequency identifier corresponding to the second identifier, the first transmission carrier frequency when the first identifier is the second identifier.

16. The first communications node according to claim 13, wherein the transmission carrier frequency configuration information of the first service type further comprises a threshold,
    wherein the determining comprises:
        determining, based on the first transmission carrier frequency identifier, the first transmission carrier frequency when the first identifier is greater than or equal to the threshold, or
        determining, based on the first transmission carrier frequency identifier corresponding to the threshold, the first transmission carrier frequency when the first identifier is less than the threshold.

17. The first communications node according to claim 13, wherein the first identifier comprises at least one of a service type identifier, a destination address identifier, a source address identifier, a carrier frequency indication identifier, or a channel indication identifier.

18. The first communications node according to claim 13, wherein the transmitting further comprises:
    skipping transmitting the first service data on the first transmission carrier frequency when a service type, indicated by the first identifier, of the first service data is not the first service type.

19. A base station comprising:
    at least one processor; and
    a non-transitory computer readable storage medium storing programming for execution by the at least one processor, the programming including instructions to cause the base station to perform operations including:
        sending a first message including transmission carrier frequency configuration information of a first service type to a first communications node,
    wherein the transmission carrier frequency configuration information of the first service type comprises at least one first transmission carrier frequency identifier in the first message, the first transmission carrier frequency identifier indicating to the first communications node to determine, based on first service data and a first identifier in a second message received by the first communications node and based on the first transmission carrier frequency identifier in the first message, a first transmission carrier frequency used to transmit the first service data, the first identifier indicating that the first service data belongs to the first service type,
    wherein the first identifier includes a priority identifier that uniquely identifies the first service type,
    wherein the first service data and the first identifier including the priority identifier are received together in the second message as a single message at a protocol layer above an access stratum sent by a second communications node,
    wherein the first message and the second message are separate messages, wherein the priority identifier is one of a set of priority identifiers, wherein the set of priority identifiers correspond to the first service type, and wherein, when the transmission carrier frequency configuration information of the first service type comprises at least two first transmission carrier frequency identifiers, the first communications node selects based on resource load statuses of transmission carrier frequencies corresponding to the at least two first transmission carrier frequency identifiers, the first transmission carrier frequency corresponding to one of the at least two first transmission carrier frequency identifiers to transmit service data.

20. The base station according to claim 19, wherein the transmission carrier frequency configuration information of the first service type further comprises at least one second identifier corresponding to the at least one first transmission carrier frequency identifier, the second identifier indicating that a transmission carrier frequency corresponding to the first transmission carrier frequency identifier supports transmission of service data of the first service type.

* * * * *